United States Patent [19]

Cutler et al.

[11] 3,744,042

[45] July 3, 1973

[54] MEMORY PROTECT FOR MAGNETIC BUBBLE MEMORY

[75] Inventors: Leonard S. Cutler, Los Altos Hills; Richard F. Lacey, Palo Alto, both of Calif.

[73] Assignee: Hewlett-Packard Company, Palo Alto, Calif.

[22] Filed: May 5, 1972

[21] Appl. No.: 250,543

[52] U.S. Cl. 340/174 TF, 340/174 SR, 340/174 PM

[51] Int. Cl. ........................ G11c 11/14, G11c 19/00

[58] Field of Search ............... 340/174 TF, 174 PM, 340/174 SR

[56] References Cited

UNITED STATES PATENTS 3,534,347 10/1970 Bobeck ........................ 340/174 T F

OTHER PUBLICATIONS

IBM Technical Disclosure Bulletin "Maximization of Usable Bubble Domain Platelet Area" by Lin et al., Vol. 13, No. 11, 4/71, p. 3219.

*Primary Examiner*—Stanley M. Urynowicz, Jr.
*Attorney*—Patrick J. Barrett

[57] ABSTRACT

A magnetic bubble memory is placed in a canted, static magnetic field to produce a holding bias for the magnetic bubbles in addition to the bubble generating bias. When a rotating magnetic field is applied to move the bubbles, a static bias is also applied to cancel out the holding bias.

3 Claims, 2 Drawing Figures

MEMORY PROTECT FOR MAGNETIC BUBBLE MEMORY

BACKGROUND AND SUMMARY OF THE INVENTION

Magnetic bubble memories are superior to most prior art memories such as magnetic discs and drums because they have greater information storage densities and operating speeds, and they require no moving parts. However, these memories require the application of a magnetic field to create the magnetic domains or bubbles as well as a field to maintain the domains at the proper locations within the memory. It is customary to have a static magnetic field perpendicular to the plane of the memory material for forming the domains, and the domains may be moved along a path by a rotating magnetic field generated by electromagnets around memory material. When power to the memory is shut off, this rotating magnetic field is also turned off, and the domains are left relatively free to move in the magnetic material since they are restrained only by the coercive force in the material. Thus, when the power is again turned on the information stored in the memory may be lost and spurious information may be there in its place.

The present invention includes a means for generating a static magnetic bias in the plane of the magnetic material to keep the magnetic domains from moving when power is shut off. This bias is provided by canting or tilting the means that generate the static magnetic field used for forming and maintaining the magnetic domains in the cylindrical form commonly called "bubbles." Since the static magnetic field is usually produced by a permanent magnet, this canting of field is achieved by simply tilting the permanent magnet with respect to the memory material. The in-plane bias must be canceled out when the memory is in use so that the rotating magnetic field can move the bubbles. To do this a D.C. bias may be applied to the coils that generate the rotating magnetic field, or, alternatively, a separate magnetic field generator may be used to generate a canceling field.

DESCRIPTION OF THE PREFERRED EMBODIMENT

Magnetic bubble memories have been known for some time and are well documented in the literature. Therefore, the detailed operation of magnetic bubble memories will not be described herein; a complete description of the basic structure and operation may be found, for example, in "Magnetic Bubbles" by Andrew H. Bobeck and H.E.D. Scovil in Scientific American, June, 1971, pages 78–90.

Figure 1:
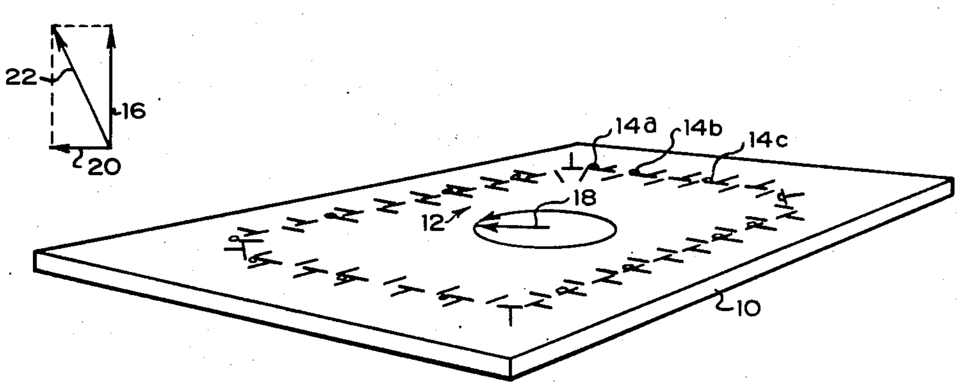
FIG. 1 shows a schematic illustration of a magnetic bubble memory and the associated magnetic field vectors.

In FIG. 1 of the drawing, a sheet of magnetic material 10 such as a rare earth garnet has a pattern of structures 12, made of a soft magnetic material such as Permalloy, that describe a path along the surface of material 10. The pattern shown is the so-called T-bar pattern but any pattern used with magnetic bubble memories may be used in connection with this invention. Several magnetic bubbles 14 are shown located around the pattern 12. These bubbles are formed by a magnetic field shown as vector 16 which is parallel to the easy axis of magnetic material 10. Magnetic material 10 has been formed to orient the crystal structure of the material such that its easy axis is normal to the major surfaces of the material. Vector 18 illustrates a rotating magnetic field. As this field rotates in a counterclockwise direction, the magnetic bubbles 14 will move around the pattern 12 in a counterclockwise direction. For each rotation of the vector 18 the bubbles will move to the next similar position on the pattern. Thus, bubble **14*b* will move to the position occupied by bubble 14*a*** when the vector has completed one complete rotation.

Each rotation of the magnetic field may be considered a cycle, and an arbitrary phase of the rotation of the field may be selected as a starting point of a cycle. Thus the position of vector 18 as shown in FIG. 1 has been arbitrarily selected as the start of a cycle for the purposes of this disclosure. Whenever the machine employing this memory is started or stopped, vector 18 starts and stops in the position shown. To insure that the information in the memory will not be lost when the rotating field is turned off, an in-plane bias magnetic field component that is equal in magnitude to vector 18, shown as vector 20, is provided parallel to the starting point of vector 18. Thus, whenever the rotating magnetic field is absent, the in-plane bias, shown by vector 20, may be generated by putting magnetic material 10 in a canted magnetic field, illustrated by vector 22, which also produces the bubble-maintaining magnetic field, shown by vector 16.

Figure 2:
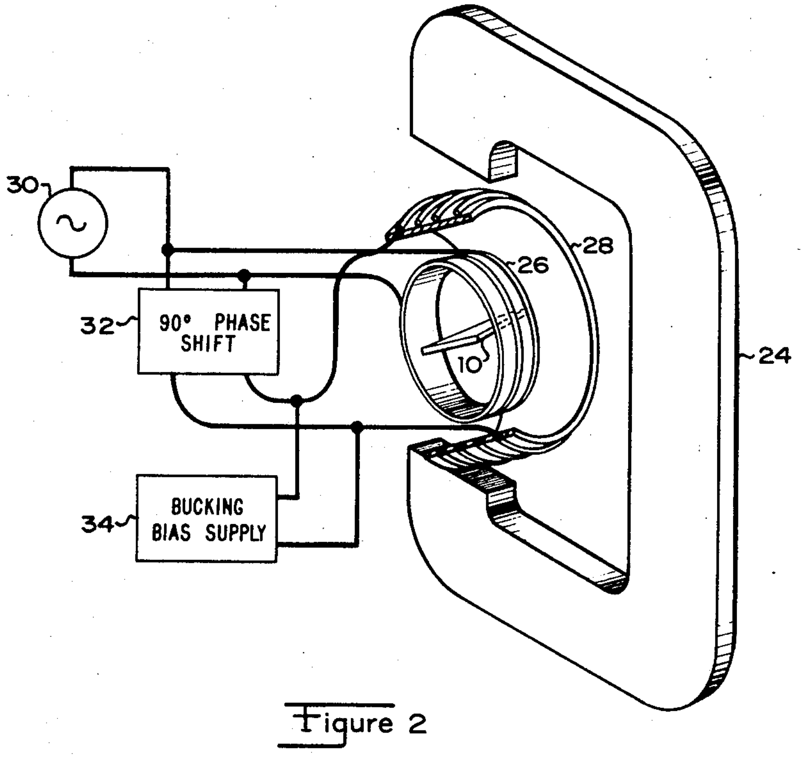
FIG. 2 shows a schematic diagram of the means for generating the magnetic fields.

FIG. 2 shows a schematic illustration of means for producing the magnetic fields shown in FIG. 1. Magnetic material 10 is shown situated in the gap of a permanent magnet 24 and canted with respect to the magnetic field lines in the gap of the permanent magnet. FIG. 2 also shows coils 26 and 28 for generating the rotating magnetic field. Coil 26 is connected to an A.C. signal generator 30, and coil 28 is connected to A.C. generator 30 through a 90° phase shifter 32. If the output generator 30 is sinusoidal, the magnetic field generated by coils 26, 28 will not only rotate but the vector representing the strength of that field will describe a circle. In order to cancel the field represented by vector 20, a D.C. bucking bias is applied by a power supply 34 to create a D.C. field in coil 28 equal in magnitude and opposite in direction to vector 20. Thus, when the rotating magnetic field generating means is in operation, the in-plane bias field is canceled out by the field generated by the bucking bias. Whenever a power failure occurs in the machine using the magnetic memory, control circuits connected to the rotating magnetic field generating means will return vector 18 to its starting position and shut down the generating circuitry. Once power is turned off, bias field shown by vector 20 will keep the bubbles from moving or wandering and thus protect the memory against information loss whether the power is shut off accidentally or purposefully.

We claim:

1. A magnetic bubble memory comprising:

a sheet of magnetic material having an easy axis substantially normal to the major surfaces of the sheet;

means for producing a first static magnetic field parallel to the easy axis for forming and maintaining magnetic bubbles in the sheet;

a pattern of structures on a major surface of the sheet describing a path along that surface for guiding magnetic bubbles formed in the sheet along the path;

means for producing a second static magnetic field normal to the easy axis for preventing movement of the magnetic bubbles in the absence of other coplanar magnetic fields; and means for producing a rotating magnetic field in the plane of the major surface for moving the bubbles along the path, including means for canceling the second static magnetic field.

2. A magnetic bubble memory as in claim 1 wherein the means for producing the first and second magnetic fields comprises a permanent magnet producing a field canted with respect to a major surface of the magnetic material.

3. A magnetic bubble memory as in claim 2 wherein the means for producing a rotating magnetic field comprises:

an A.C. signal generator;

a first coil surrounding the magnetic material and connected to the A.C. signal generator;

a phase shifter connected to the A.C. signal generator;

a second coil, orthogonal to the first coil, surrounding the magnetic material and connected to the phase shifter; and a bucking bias supply connected to the coils to produce a field for canceling the second static magnetic field.

* * * * *